June 12, 1923.  1,458,346

C. J. KRENTZ ET AL

ATTACHMENT FOR RADIATOR CAPS AND THE LIKE

Filed July 17, 1922

Inventors
Charles J. Krentz
George D. Krentz
by Geiger & Topf
Attorneys.

Patented June 12, 1923.

1,458,346

UNITED STATES PATENT OFFICE.

CHARLES J. KRENTZ AND GEORGE W. KRENTZ, OF BUFFALO, NEW YORK.

ATTACHMENT FOR RADIATOR CAPS AND THE LIKE.

Application filed July 17, 1922. Serial No. 575,671.

*To all whom it may concern:*

Be it known that we, CHARLES J. KRENTZ and GEORGE W. KRENTZ, citizens of the United States, and residents of Buffalo, in the county of Erie and State of New York, have invented new and useful Improvements in Attachments for Radiator Caps and the like, of which the following is a specification.

This invention relates to a locking or retaining device more particularly adapted for use in connection with the radiator caps and motor meters of automobiles.

One of its objects is to provide a simple, reliable and inexpensive lock of this character, which while permitting ready removal of the cap for filling the radiator, insures the same against loss or theft.

A further object is to provide improved means for automatically and positively locking the retaining member of the device in its unfolded operative position.

In the accompanying drawings.

Similar characters of reference indicate corresponding parts throughout the several views.

Figure 1:
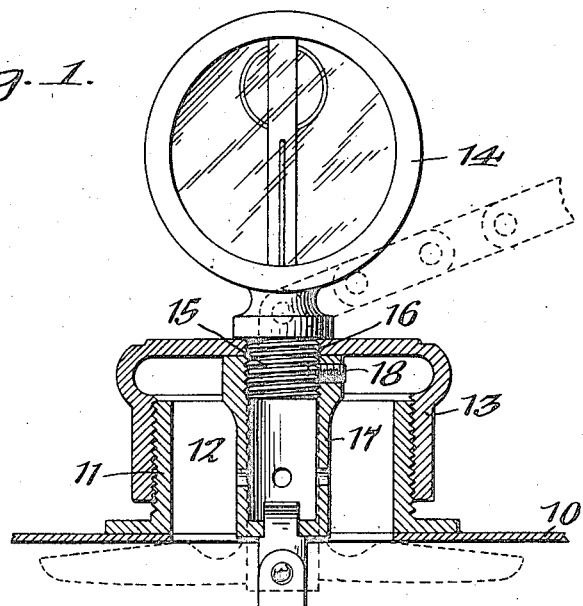
Figure 1 is a fragmentary vertical section showing a radiator filling cap and motor meter equipped with the improvement.
Figure 2:
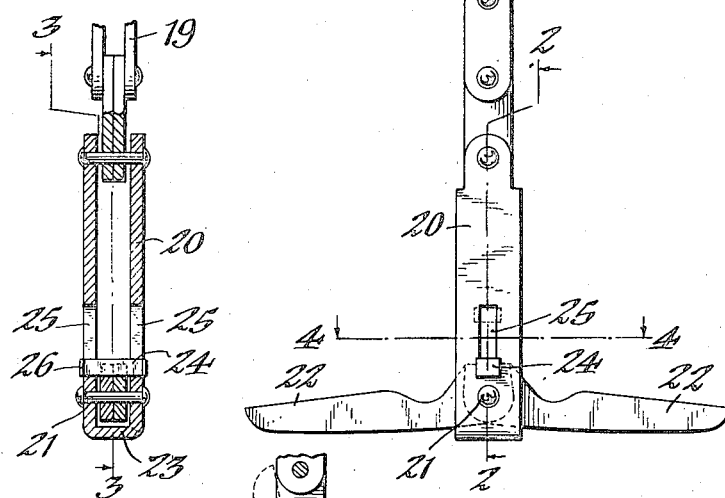
Figure 2 is a transverse vertical section on line 2—2, Fig. 1.

Referring more particularly to Fig. 1, 10 represents the top or upper wall of an automobile radiator having the usual neck 11 forming the filling opening 12 which is normally closed by the customary screw cap 13. In this instance, the cap is provided with a motor meter or thermometer 14 of ordinary construction, having a screw threaded shank 15 at its lower end which passes through a threaded opening 16 in the top of said cap. A coupling sleeve 17 is applied to the shank 15 and securely held in place thereon by a set screw 18, thus reliably locking the motor meter to the filler cap 13.

The improved retaining device for preventing the complete detachment of the filler cap and its motor meter from the radiator is preferably constructed as follows:

19 represents a flexible connecting member which may be in the form of a chain and which is suitably fastened at its upper end to the coupling sleeve 17, so as to normally hang in a pendant position within the radiator tank. To the lower link of this chain is pivoted a hanger or U-shaped supporting head 20. Pivoted to the lower end of the latter on a transverse pivot 21 is an anchoring device including a pair of oppositely-extending anchoring arms 22 whose inner ends are arranged side by side in the space formed between the side walls of said supporting head. In their unfolded operative position, shown in Fig. 1, said arms are adapted to engage the inner side of the upper wall of that portion of the radiator tank surrounding the filling opening 12 and prevent the withdrawal of the retaining device from the tank, thus rendering it impossible under normal conditions to wholly detach the closure cap 13 from the radiator. These anchoring arms are prevented from swinging downwardly below their substantially horizontal unfolded position relatively to the head 20 by their lower edges abutting against the corresponding lateral edges of the cross piece 23 of said head.

Figures 3, 4:
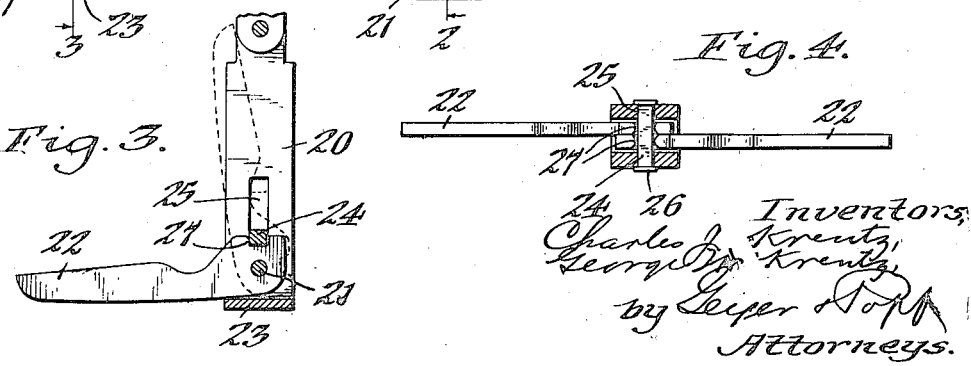
Figure 3 is a vertical section on line 3—3, Fig. 2.
Figure 4 is a horizontal section on line 4—4, Fig. 2.

An automatic locking device is provided for positively holding the anchoring arms 22 in their normal unfolded position and locking them against movement upwardly or to the folded position shown by dotted lines in Fig. 3, after these arms have once been inserted or dropped through the filling opening of the radiator. For this purpose, a gravity actuated floating detent or locking bolt 24 is provided in the lower end of the supporting head 20 which is adapted to interlock with the anchoring arms when the connecting member 19 and said head are in a pendant position, as shown in Fig. 1. This locking bolt is disposed transversely of the supporting head above the pivot 21 of the arms 22 and is guided in upright slots 25 formed in the side walls of said head. The ends of the locking bolt are preferably upset to form heads 26 to prevent lateral displacement of the same from their guide slots. The inner end of each anchoring arm is provided in its upper side with a locking shoulder which may be in the form of a notch 27 and with which the locking bolt is adapted to interlock.

By this arrangement, when this improved retaining device is in position within a radiator, it is practically impossible to release the locking bolt from engagement with the anchoring arms by the use of ordinary tools, thereby effectively obstructing the upward folding of these arms against the opposite sides of the supporting head 20 and preventing the theft of the closure cap and its motor meter.

In inserting the anchoring device through the filling opening of a radiator, the locking bolt 24 is lifted clear of the arms 22 to permit them to be swung upwardly to the folded position shown by dotted lines in Fig. 3, after which the anchor and its connecting chain may be readily dropped through said filling opening into the radiator tank. In dropping through the filling opening, the anchoring device assumes a pendant position and the arms swing downwardly by their own weight to their normal operative position. At the same time, the locking bolt automatically drops into engagement with the shoulders 27 of the anchoring arms, positively locking them in their unfolded position. Any attempt to remove the radiator closure cap will be prevented by these arms striking the upper wall of the radiator.

We claim as our invention:

1. An attachment for a closure cap of the character described, comprising a supporting member arranged to be suspended from the cap, a foldable anchoring device mounted on said member, means at the lower end of said member for preventing said anchoring device from swinging below its extended operative position, and a floating locking bolt guided on said member and arranged to interlock with the anchoring device in its unfolded operative position.

2. An attachment for a closure cap of the character described, comprising a supporting member arranged to be suspended from the cap and including spaced side walls and a bottom, foldable anchoring devices pivoted between the side walls of said member and arranged to engage the bottom of the latter to hold them against swinging downwardly from a substantially horizontal operative position, the inner ends of said devices being provided with locking shoulders, and a gravity controlled locking bolt guided in the side walls of the supporting member and arranged to interlock with said shoulders for positively resisting the upward folding movement of the anchoring devices from such horizontal position.

3. An attachment for a closure cap of the character described, comprising a supporting member arranged to be suspended from the cap and provided in its sides with guide slots, a foldable anchoring device pivoted to said member in a plane at right angles to said guide slots, and a locking bolt guided in said slots and arranged to interlock with said anchoring device to positively resist folding of the same out of its horizontal operative position.

4. An attachment for a closure cap of the character described, comprising a substantially U-shaped supporting member arranged to be suspended from the cap and provided in its sides with alining guide slots, a pair of oppositely-extending anchoring arms pivoted at their inner ends to said supporting member at a point below said guide slots, the inner ends of said arms being provided in their upper sides with locking notches and their lower sides being arranged to engage the bottom of said U-shaped member to prevent them from swinging below the latter, and a gravity-controlled locking bolt guided in said slots and arranged to interlock with said locking notches in the unfolded operative position of said anchoring arms.

CHARLES J. KRENTZ.
GEORGE W. KRENTZ.